US012602767B1

(12) United States Patent
Mee et al.

(10) Patent No.: US 12,602,767 B1
(45) Date of Patent: Apr. 14, 2026

(54) SYSTEM OF AND METHOD FOR ANALYZING THOROUGHFARE CONDITIONS VIA OIL SPOT ANALYSIS

(71) Applicant: University of South Florida, Tampa, FL (US)

(72) Inventors: Tristen Edward Mee, Brooksville, FL (US); Austin Gray Mullins, Bradenton, FL (US)

(73) Assignee: University of South Florida, Tampa, FL (US)

( * ) Notice: Subject to any disclaimer, the term of this patent is extended or adjusted under 35 U.S.C. 154(b) by 483 days.

(21) Appl. No.: 17/987,520

(22) Filed: Nov. 15, 2022

(51) Int. Cl.
| | |
|---|---|
| *G06T 7/00* | (2017.01) |
| *G01C 21/34* | (2006.01) |
| *G01C 21/36* | (2006.01) |
| *G06V 10/25* | (2022.01) |
| *G06V 10/82* | (2022.01) |

(Continued)

(52) U.S. Cl.
CPC ........ *G06T 7/0008* (2013.01); *G01C 21/3415* (2013.01); *G01C 21/3461* (2013.01); *G01C 21/3602* (2013.01); *G01C 21/3647* (2013.01); *G06V 10/25* (2022.01); *G06V 10/82* (2022.01); *G06V 20/13* (2022.01); *G06V 20/182* (2022.01); *G06T 2200/24* (2013.01); *G06T 2207/10032* (2013.01); *G06T 2207/20081* (2013.01); *G06T 2207/30184* (2013.01)

(58) Field of Classification Search
CPC .............. G06T 7/0008; G06T 2200/24; G06T 2207/10032; G06T 2207/20081; G06T 2207/30184; G06V 10/25; G06V 10/82; G06V 20/182; G06V 20/13; G01C 21/3415; G01C 21/3461; G01C 21/3602; G01C 21/3647

See application file for complete search history.

(56) References Cited

U.S. PATENT DOCUMENTS

| | | | |
|---|---|---|---|
| 2016/0171278 A1 | 6/2016 | Ponder et al. | |
| 2022/0262111 A1* | 8/2022 | Yamasaki | G06V 20/588 |
| 2023/0082390 A1* | 3/2023 | Hayes | G08G 1/0112 |
| | | | 701/423 |

FOREIGN PATENT DOCUMENTS

| | | |
|---|---|---|
| CN | 111737524 A | 10/2020 |
| CN | 113433940 A | 9/2021 |
| DE | 102019121919 A1 * | 2/2021 |

(Continued)

*Primary Examiner* — Vincent Rudolph
*Assistant Examiner* — Bradley O Felix
(74) *Attorney, Agent, or Firm* — Molly L. Sauter; Trenam Law

(57) ABSTRACT

Described herein relates to a system of and method for analyzing a condition of a thoroughfare, via dark discoloration in a surface of the thoroughfare, such as an oil formation from oil droplets dislodged from the underside of a vehicle. The oil droplets may be dislodged from the underside of a vehicle due to the sudden downward vehicle motion coupled with a rapid upward acceleration when passing over a distressed thoroughfare. The thoroughfare analysis system may be configured to input at least one thoroughfare image and compare it to at least one trained image of at least one trained dataset to determine a condition of the thoroughfare. Additionally, the thoroughfare analysis system may be configured to provide at least one alternative thoroughfare based on the condition of the thoroughfare as determined by the thoroughfare analysis system.

20 Claims, 14 Drawing Sheets

(51) Int. Cl.
    *G06V 20/10*         (2022.01)
    *G06V 20/13*         (2022.01)

(56)            References Cited

FOREIGN PATENT DOCUMENTS

JP      2019196680 A  *  11/2019
TW       M600416 U  *  8/2020
WO    WO-2017176550 A1  *  10/2017  ......... G01C 21/3415

* cited by examiner

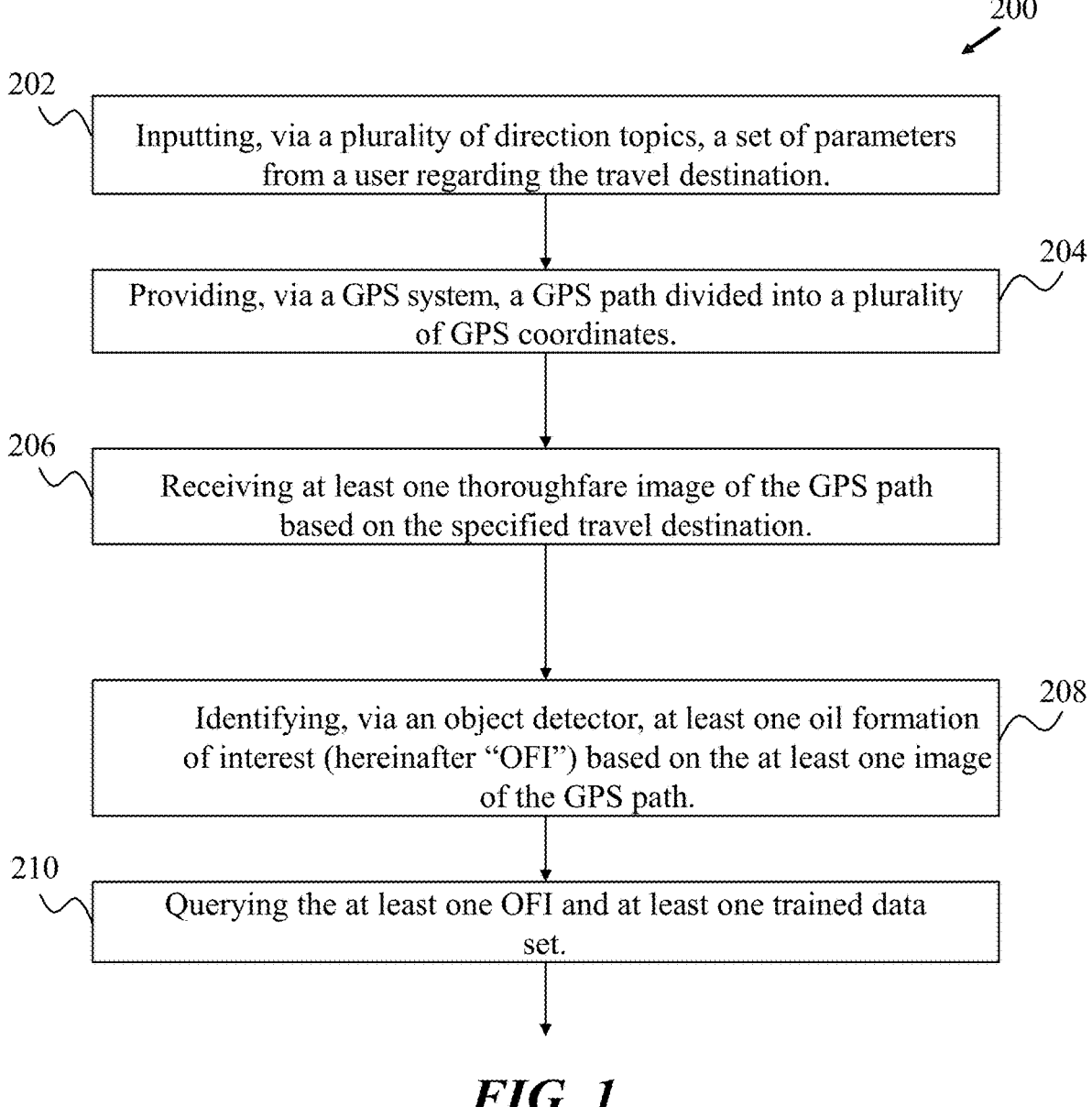

200

202
Inputting, via a plurality of direction topics, a set of parameters from a user regarding the travel destination.

204
Providing, via a GPS system, a GPS path divided into a plurality of GPS coordinates.

206
Receiving at least one thoroughfare image of the GPS path based on the specified travel destination.

208
Identifying, via an object detector, at least one oil formation of interest (hereinafter "OFI") based on the at least one image of the GPS path.

210
Querying the at least one OFI and at least one trained data set.

SYSTEM OF AND METHOD FOR ANALYZING THOROUGHFARE CONDITIONS VIA OIL SPOT ANALYSIS

BACKGROUND OF THE INVENTION

1. Field of the Invention

This invention relates, generally, to thoroughfare repair. More specifically, it relates to system of and method for analyzing a condition of a thoroughfare utilizing oil spot analysis.

2. Brief Description of the Prior Art

Transportation officials nationwide are faced with increasing maintenance demands stemming from aging infrastructure, stretched budgets, and a growing population. This is apparent by distressed thoroughfares (e.g., road, street, roadway, highway, etc.) that unfortunately cannot be serviced in a timely fashion. For example, in 2021, the American Society of Civil Engineering (hereinafter "ASCE") gave Florida's roads a grade of C+ in their infrastructure report card. While this is better than the grade of D given nationally to road infrastructure, 31% of Florida's roads are in poor or mediocre condition, costing drivers an extra $425 annually on average in additional repairs from driving on deteriorating roads.

The concept of using oil spot formations to detect roadway distress raises the question: "Are there enough vehicles with a mild (or severe) oil leak sufficient to provide a reliable roadway distress metric?" The average vehicle on the road in 2020 was 11.9 years old (24% increase from 2002)[3] and the average driver puts 13,476 miles on their car every year.[5] This translates into the average vehicle having 160,000 miles on the odometer. In fact, studies suggest 200,000 miles is now considered the new norm for vehicle life. While not a hard and fast number, serious repairs begin between 60 and 100k miles. So yes, there should be a large portion of the traveling public with oil leaks.

Currently known thoroughfare assessment techniques generally rely on visual scrutiny and highly specialized vehicles with inertial profilers to detect any issues within the thoroughfare which may compromise its integrity. However, the use of visual scrutiny and high specialized vehicles comes with substantial drawbacks. First, an individual tasked with determining roadway distress is required to bring in specific equipment to assess the roadway, leading to substantial downtime. Second, using specialized vehicles with inertial profilers is exceedingly expensive, while being wasteful if the roadway is in a healthy condition. Finally, several individuals are required to visit the assessment site, potentially putting them at risk if the thoroughfare, bridge, and/or the like, is severely damaged, or structurally compromised. Accordingly, applications of such distress assessment are limited in their applicability and effectiveness, as they require a group of individuals to operate the assessment apparatuses, while only being available during specific timeframes. Thus, currently known thoroughfare assessment techniques are incapable of effective and/or hands-free analysis of a thoroughfare.

Accordingly, what is needed is a safe, easy-to-use, hands-free and efficient system and method for analyzing a condition of a thoroughfare. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to an aspect of the present disclosure pertains to a method of automatically analyzing a condition of a thoroughfare. In embodiments, the method may comprise the following steps, including but not limited to: (a) providing a computing device having a processor, such that the computing device is in electrical communication with at least one server, at least one database, or both; (b) selecting, via the processor of the computing device, at least one thoroughfare image, by: (i) inputting, via a graphical-user interface of the computing device, at least one parameter regarding a travel destination of a user; (ii) providing, via a GPS system of the computing device, a GPS path divided into a plurality of GPS coordinates based on the at least one parameter; (iii) receiving, via the at least one server, the at least one database, or both, at least one thoroughfare image based on at least one of the plurality of GPS coordinates; (c) identifying, via the processor of the computing device, at least one oil formation of interest (hereinafter "OFI") disposed about the at least one thoroughfare image; (d) generating, via the processor of the computing device, a bounding box surrounding the at least one OFI of the at least one thoroughfare image; (e) transmitting, via the processor of the computing device, the bounding box surrounding the at least one detected OFI of the at least one thoroughfare image to a memory of the computing device; (f) comparing, via the processor of the computing device, the at least one detected OFI with a plurality of training images from a trained dataset; (g) calculating, via the processor of the computing device, a likelihood of defect within the bounding box of the at least one thoroughfare image based on the comparison with the trained dataset; and (h) automatically transmitting, via the processor of the computing device, the likelihood of defect of the thoroughfare to a display device of the computing device.

In some embodiments, the method may further include the step of, after generating a bounding box surrounding the at least one OFI of the at least one thoroughfare image, highlighting the at least OFI of the at least one thoroughfare image. In these other embodiments, the highlight of the at least one OFI of the at least one thoroughfare image may be brighter than at least one remaining aspect of the at least one OFI.

Additionally, in some embodiments, the method may further include the step of, after transmitting at least one metric regarding the likelihood of the thoroughfare, providing, via the processor of the computing device, at least one metric regarding a condition of the thoroughfare based on the calculated likelihood of defect. Accordingly, the method may further include the step of, after providing at least one metric regarding a condition of the thoroughfare based on the calculated likelihood of defect, calculating, via the processor of the computing device, at least one alternative GPS path, at least one alternative thoroughfare, or both to the travel destination based on the at least one metric regarding the condition of the thoroughfare. In this manner, in these other embodiments, the method may further comprise the step of, after calculating at least one alternative GPS path, at least one alternative thoroughfare, or both, displaying, via the display device of the computing device, the at least one calculated alternative GPS path, alternative thoroughfare, or both by: (iv) based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and (v) based on a determined that the likelihood of defect of the thoroughfare is less than the likelihood of defect of the at least one calculated alternative thoroughfare, maintaining the GPS path to conform to the thoroughfare.

In some embodiments, the at least one metric may comprise the following, including but not limited to a recommended speed, a number of potholes per mile on the thoroughfare, a number of bumps per mile on the thoroughfare, and/or a combination of thereof.

Moreover, in some embodiments, the method may further include the step of, after transmitting the likelihood of defect to the display device of the computing device, receiving an instruction to unload, from the memory of the computing device, the at least one thoroughfare image. As such, after receiving an instruction to unload the at least one thoroughfare image, the method may further comprise the step of receiving at least one alternative thoroughfare image based on at least one alternative GPS path provided from at least one set of alternative parameters.

Additionally, another aspect of the present disclosure pertains to a thoroughfare analysis system for automatically analyzing a condition of a thoroughfare. In embodiments, the thoroughfare analysis system may comprise the following, including but not limited to: (a) a computing device having a processor, wherein the computing device is in electrical communication with at least one server, at least one database, or both; and (b) a non-transitory computer-readable medium operably coupled to the processor, the computer-readable medium having computer-readable instructions stored thereon that, when executed by the processor, cause the thoroughfare analysis system to automatically analyze the condition of the thoroughfare by executing instructions comprising the following, including but not limited to: (i) selecting, via the processor of the computing device, at least one thoroughfare image, by: (I) inputting, via a graphical-user interface of the computing device, at least one parameter regarding a travel destination of a user; (II) providing, via a GPS system of the computing device, a GPS path divided into a plurality of GPS coordinates based on the at least one parameter; (III) receiving, via the at least one server, the at least one database, or both, at least one thoroughfare image based on at least one of the plurality of GPS coordinates; (ii) identifying, via the processor of the computing device, at least one oil formation of interest (hereinafter "OFI") disposed about the at least one thoroughfare image; (iii) generating, via the processor of the computing device, a bounding box surrounding the at least one OFI of the at least one thoroughfare image; (iv) transmitting, via the processor of the computing device, the bounding box surrounding the at least one detected OFI of the at least one thoroughfare image to a memory of the computing device; (v) comparing, via the processor of the computing device, the at least one detected OFI with a plurality of training images from a trained dataset; (vi) calculating, via the processor of the computing device, a likelihood of defect within the bounding box of the at least one thoroughfare image based on the comparison with the trained dataset; and (vii) automatically transmitting, via the processor of the computing device, the likelihood of defect of the thoroughfare to a display device of the computing device.

In some embodiments, the executed instructions of the thoroughfare analysis system may further include, after generating a bounding box surrounding the at least one OFI of the at least one thoroughfare image, highlighting the at least OFI of the at least one thoroughfare image. In these other embodiments, the highlight of the at least one OFI of the at least one thoroughfare image may be brighter than at least one remaining aspect of the at least one OFI.

In some embodiments, the executed instructions of the thoroughfare analysis system may further comprise, after transmitting at least one metric regarding the likelihood of the thoroughfare, providing, via the processor of the computing device, at least one metric regarding a condition of the thoroughfare based on the calculated likelihood of defect. As such, the executed instructions of the thoroughfare analysis system may also include the step of, after providing at least one metric regarding a condition of the thoroughfare based on the calculated likelihood of defect, calculating, via the processor of the computing device, at least one alternative GPS path, at least one alternative thoroughfare, or both to the travel destination based on the at least one metric regarding the condition of the thoroughfare. Finally, in this manner, the executed instructions of the thoroughfare analysis system may further comprise after calculating at least one alternative GPS path, at least one alternative thoroughfare, or both, displaying, via the display device of the computing device, the at least one calculated alternative GPS path, alternative thoroughfare, or both by: (A) based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and (B) based on a determined that the likelihood of defect of the thoroughfare is less than the likelihood of defect of the at least one calculated alternative thoroughfare, maintaining the GPS path to conform to the thoroughfare.

In some embodiments, the at least one metric may comprise the following, including but not limited to, a recommended speed, a number of potholes per mile on the thoroughfare, a number of bumps per mile on the thoroughfare, and/or a combination of thereof.

In some embodiments, the executed instructions of the thoroughfare analysis system may further comprise the step of, after transmitting the likelihood of defect to the display device of the computing device, receiving an instruction to unload, from the memory of the computing device, the at least one thoroughfare image. Moreover, in these other embodiments, the executed instructions of the thoroughfare analysis system may also comprise the step of, after receiving an instruction to unload the at least one thoroughfare image, receiving at least one alternative thoroughfare image based on at least one alternative GPS path provided from at least one set of alternative parameters.

Finally, another aspect of the present disclosure pertains to a method of automatically providing an optimized GPS path to a travel destination based on a condition of a thoroughfare. In embodiments, the method may comprise the following steps, including but not limited to: (a) providing a computing device having a processor, such that the computing device is in electrical communication with at least one server, at least one database, or both; (b) selecting, via the processor of the computing device, at least one thoroughfare image, by: (I) inputting, via a graphical-user interface of the computing device, at least one parameter regarding a travel destination of a user; (II) providing, via a GPS system of the computing device, a GPS path divided into a plurality of GPS coordinates based on the at least one parameter; (III) receiving, via the at least one server, the at least one database, or both, at least one thoroughfare image based on at least one of the plurality of GPS coordinates; (c) identifying, via the processor of the computing device, at least one oil formation of interest (hereinafter "OFI") disposed about the at least one thoroughfare image; (d) generating, via the processor of the computing device, a bounding box surrounding the at least one OFI of the at least one thoroughfare image; (e) transmitting, via the processor of the computing device, the bounding box surrounding the at least one detected OFI of the at least one thoroughfare image to a memory of the computing device; (f) comparing, via the processor of the computing device, the at least one detected OFI with a plurality of training images from a trained dataset; (g) calculating, via the processor of the computing device, a likelihood of defect within the bounding box of the at least one thoroughfare image based on the comparison with the trained dataset; (h) transmitting, via the processor of the computing device, the likelihood of defect of the thoroughfare to a display device of the computing device; (i) calculating, via the processor of the computing device, at least one alternative GPS path, at least one alternative thoroughfare, or both to the travel destination based on the likelihood of defect of the thoroughfare; and (j) automatically displaying, via the display device of the computing device, the GPS path, the at least one calculated alternative GPS path, or both by: (A) based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and (B) based on a determined that the likelihood of defect of the thoroughfare is less than the likelihood of defect of the at least one calculated alternative thoroughfare, maintaining the GPS path to conform to the thoroughfare.

In some embodiments, the method may further include the steps of: (k) receiving an instruction to unload, from the memory of the computing device, the at least one thoroughfare image; and (l) receiving at least one alternative thoroughfare image based on at least one alternative GPS path provided from at least one set of alternative parameters.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 7A is a processed satellite image with a high level of confidence around a potential area of interest of the thoroughfare analysis system. FIG. 7B is a processed satellite image with a low level of confidence around a potential area of interest of the thoroughfare analysis system. FIG. 7C is a processed satellite image with a moderate level of confidence around a potential area of interest of the thoroughfare analysis system.

FIG. 8A is a processed satellite image with a bounding box around the at least one are of interest of a thoroughfare analysis system on a curved portion of the thoroughfare. FIG. 8B is a processed satellite image with a bounding box around the at least one are of interest of a thoroughfare analysis system on a street connected to the thoroughfare. FIG. 8C is a processed satellite image with a bounding box around the at least one are of interest of a thoroughfare analysis system on a straight portion of the thoroughfare.

FIG. 12A is an exemplary satellite image input of a thoroughfare analysis system. FIG. 12B is an exemplary driver level image input of a thoroughfare analysis system. FIG. 12C is an exemplary street level image input of a thoroughfare analysis system, according to an embodiment of the present disclosure.

DETAILED DESCRIPTION OF THE INVENTION

Figure 1:
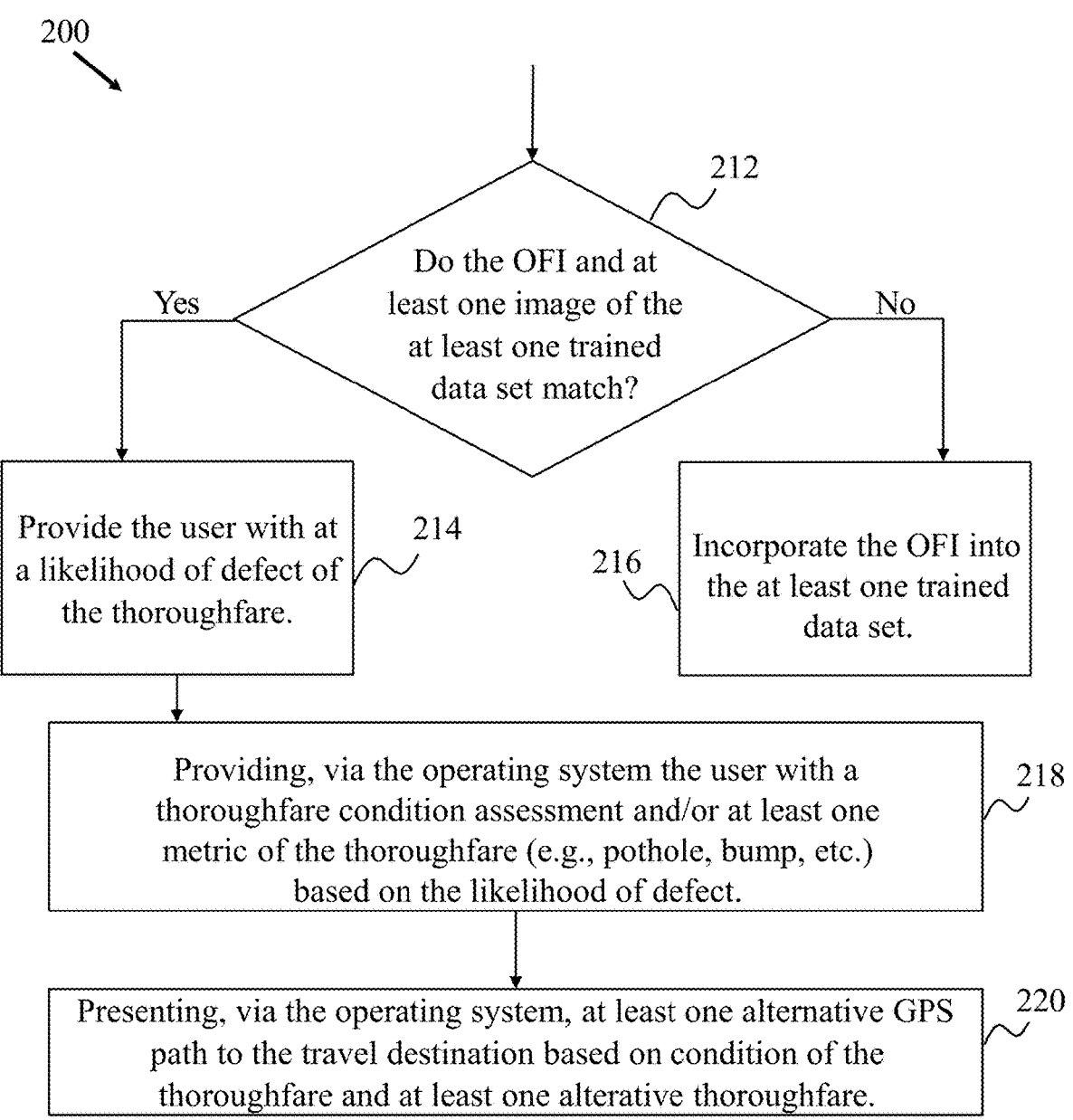
FIG. 1 is an exemplary process flow diagram depicting a method of providing a condition assessment of a thoroughfare based on at least one oil spot, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, and/or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, "about" means approximately or nearly and in the context of a numerical value or range set forth means ±15% of the numerical.

As used herein, the term "thoroughfare image" refers to any image known in the art which may provide at least one user with an optical view of at least one thoroughfare and/or the surrounding terrain. The thoroughfare image may be a satellite image, street level image, and/or vehicle view image. For ease of reference, the exemplary embodiment described herein refers to a satellite image and/or a street level image, but this description should not be interpreted as exclusionary of other images.

As used herein, the term "alternative database" refers to any database known in the art in which an operating system may communicate to obtain at least one image and/or GPS coordinates of at least one thoroughfare. The alternative database may be Google Maps Static API, Maps JavaScript API, Planet API, NASA Earth API, and/or UrtheCast Geosys API. For ease of reference, the exemplary embodiment described herein refers to Google Maps Static API, but this description should not be interpreted as exclusionary of other APIs.

As used herein, the term "training image" refers to any image known in the art which may provide at least one user with an optical view of at least one thoroughfare and/or the surrounding terrain, such that an operating system and/or algorithm may be trained. The training image may be a satellite image, street level image, and/or vehicle view image. For ease of reference, the exemplary embodiment described herein refers to satellite images and/or a street level images, but this description should not be interpreted as exclusionary of other images.

As used herein, the term "ground truth data" refers to any metric known in the art in relation to a health and/or condition of a thoroughfare. The ground truth data may be acceleration of a vehicle, an amount of bumps, cracks, material of the thoroughfare, an amount of dips, and/or an amount of potholes. For ease of reference, the exemplary embodiment described herein refers to acceleration of a vehicle, an amount of bumps, cracks, material of the thoroughfare, an amount of dips, and/or an amount of potholes, but this description should not be interpreted as exclusionary of other thoroughfare and/or vehicle metrics.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," and/or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," "at most," and/or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Figure 2:
FIG. 2 is a driver level image input of a thoroughfare analysis system, according to an embodiment of the present disclosure.
Figure 3:
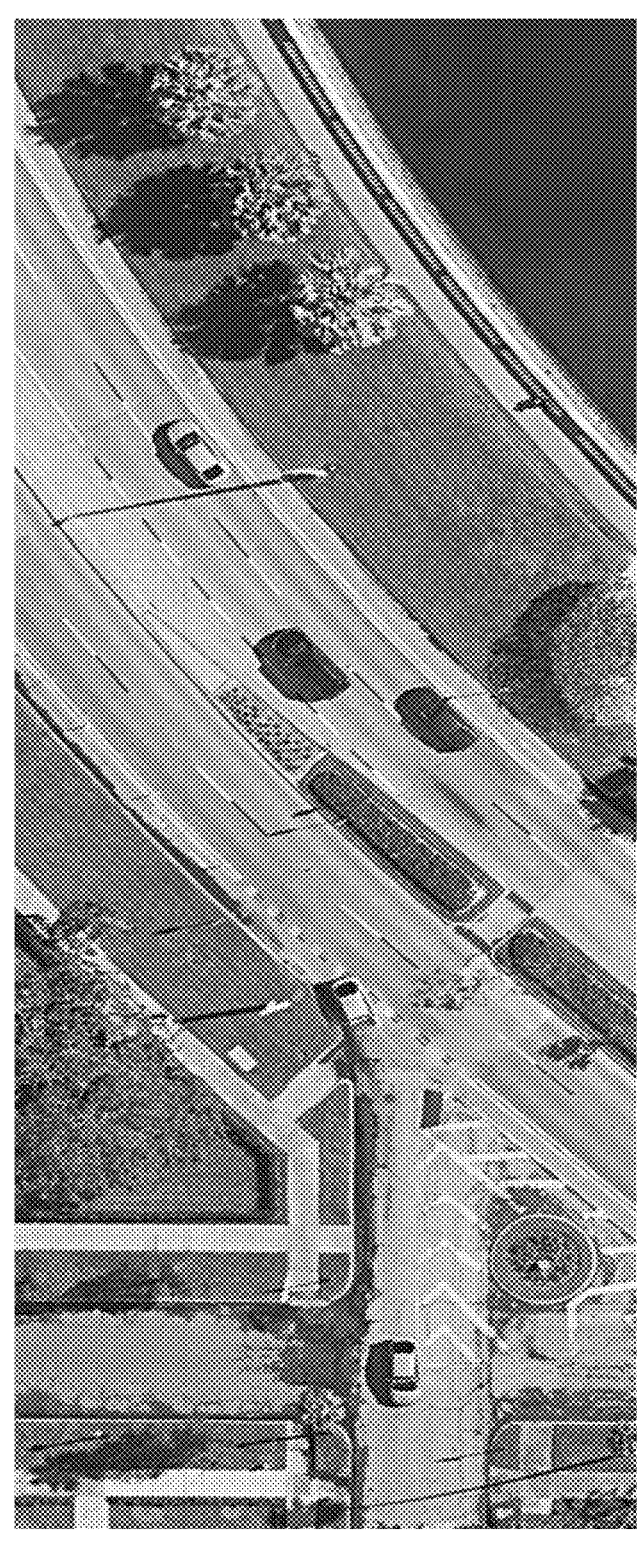
FIG. 3 is a satellite image input of a thoroughfare analysis system, according to an embodiment of the present disclosure.

Oil Spot Thoroughfare Analysis:

The present disclosure pertains to a system and method for analyzing a condition of a thoroughfare via oil spot analysis. While most drivers are not aware of it, drivers respond to visual cues that might indicate an upcoming bump in the thoroughfare that may cause damage to their vehicle or at least disrupt the quality of their ride. One such cue may be a dark discoloration in the pavement, as shown in FIG. 2. However, when viewed from an aerial and/or satellite photograph it is far more elongated forming more of an ellipse, as shown in FIG. 3. These discolorations may be caused by oil droplets that dislodge from the underside of a vehicle from the sudden downward vehicle motion coupled with a rapid upward acceleration when passing over a section of distressed or damaged thoroughfare. The sudden downward vehicle motion may then break the surface tension of the oil droplet adhering to the underside of the vehicle and therefore may promote the slow but steady flow rate of the oil leaking process. As such, in embodiments, the present disclosure may comprise a thoroughfare analysis system configured to communicate with at least one database such that at least one thoroughfare image may be inputted into the thoroughfare analysis system.

FIG. 1 depicts an exemplary process flow diagram depicting a method 200 of automatically analyzing and/or providing a condition assessment of a thoroughfare based on at least one oil spot, according to an embodiment of the present disclosure. The steps delineated in FIG. 1 are merely exemplary of an order of analyzing and/or providing a condition assessment of a thoroughfare. The steps may be carried out in another order, with or without additional steps included therein.

As shown in FIG. 1, in embodiments, method 200 beings at step 202, in which a set of parameters is received by the thoroughfare analysis system, via a plurality of direction topics provided by the thoroughfare analysis system. As such, in these embodiments, this step may include the thoroughfare analysis system providing the plurality of direction topics to at least one user via a computing device associated with the thoroughfare analysis system comprising a processor, a display device, and/or a user interface, such that the at least one user may select, via the user interface, at least one of the plurality of direction topics provided by the thoroughfare analysis system such that the thoroughfare analysis system may be configured to provide a set of parameters based on the at least one of the plurality of direction topics selected by the at least one user.

For example, the user interface of the thoroughfare analysis system may be configured to receive at least one start location, at least one end location, and/or at least one thoroughfare between the at least one start location and the at least one end location as provided by the plurality of direction topics and/or as selected by the at least one user. The direction topic may then be stored within a memory of the thoroughfare analysis system, such that the thoroughfare analysis system may then access the memory prior to finalizing the at least one parameter. As such, next, as shown in step 204, in these embodiments, the thoroughfare analysis system may be configured to divide the GPS path into a set of GPS coordinates.

In this manner, as shown in step 206, in embodiments, the thoroughfare analysis system may then be configured to communicate with at least one alternative database (e.g., Google Maps Static API), such that the GPS coordinates may be used to obtain at least one thoroughfare image of the GPS path, such that the center of the at least one thoroughfare image may be at least one of the specified GPS coordinates. In this manner, the thoroughfare analysis system may then be configured to input the at least one thoroughfare image into the memory of the thoroughfare analysis system and/or a server, such that the thoroughfare analysis system may be configured to retain and/or access the at least one thoroughfare image. Accordingly, in these embodiments, the thoroughfare analysis system may then be configured to divide the specified path into a plurality of points, such that overlap between at least one thoroughfare image and at least one alternative thoroughfare image may be obtained, without causing inefficiencies and/or redundant points within the plurality of points.

In some embodiments, the street view images may allow the at least one user alternative from at least one satellite image and/or view to at least one street level image and/or view to see the thoroughfare and/or the surrounding buildings, terrain, etc., via the thoroughfare analysis system. The inclusion of the at least one street level image and/or view may be used by the thoroughfare analysis system to provide a qualitative verification of the presence of the at least one oil formation as seen from the thoroughfare image (e.g., the satellite image).

Figure 13:
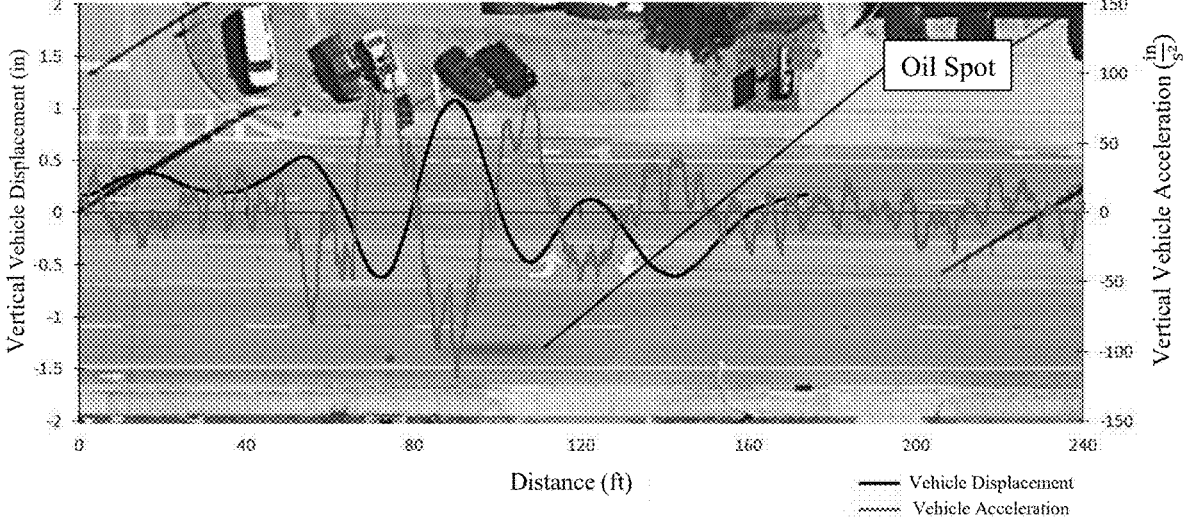
FIG. 13 depicts an accelerometer data plot overlayed on an exemplary satellite image input of a thoroughfare analysis system, according to an embodiment of the present disclosure.

Additionally, in some embodiments, as shown in FIG. 13, the thoroughfare analysis system may be configured to intake at least one vehicle acceleration record and/or an associated GPS location (e.g., GPS data) via at least one server and/or at least one database to verify the findings of the at least one thoroughfare image to identify areas of thoroughfare degradation. In this manner, the acceleration records and/or associated GPS data may be obtained by driving an instrumented vehicle over thoroughfares of interest for the purpose of verifying the presence of at least one thoroughfare anomaly (e.g., pothole, dip, bump, etc.) and/or the overall condition of the thoroughfare.

Next, as shown in FIG. 1, at step 208, in embodiments, the thoroughfare analysis system may be configured to identify, via at least one object detector (e.g., an aggregate channel feature (hereinafter "ACF") object detector, object detector comprising an image recognition software and/or algorithm), at least one oil formation of interest (hereinafter "OFI") based on the at least one thoroughfare image obtained based on the GPS path determined via the set of parameters provided by the user. Accordingly, in these embodiments, the at least one object detector may be trained using at least one trained dataset comprising a plurality of training images (e.g., satellite images, driver view images, and/or Google Street view images) and ground truth data (e.g., accelerometer data and/or a condition of the thoroughfare (e.g., pot holes, bumps, etc.)), in which the at least one trained dataset may be stored within the memory of the thoroughfare analysis system, a server in electrical communication with the thoroughfare analysis system, and/or any memory device known in the art, in which the thoroughfare analysis system may be configured to electronically communicate with in order to access the at least one trained dataset. In these embodiments, the ground truth data may be created by manually labeling, via user input, and/or automatically labeling, via the thoroughfare analysis system, the OFIs within each training image of the trained dataset.

In addition, in embodiments, the object detector of the thoroughfare analysis system may detect new and/or unforeseen alternative OFIs on the thoroughfare, independently of the at least one OFI, which may be present in the at least one trained dataset. Moreover, the object detector of the thoroughfare analysis system may be configured to isolate the thoroughfare from the surroundings (e.g., buildings, trees, etc.), such that the object detector of the thoroughfare analysis system may identify an OFI as compared to a darker surrounding and/or a shadow and/or darkness on the thoroughfare cared by the surroundings as shown in the at least one thoroughfare image.

Figure 9:
FIG. 9 is an alternative satellite image input of a thoroughfare analysis system, according to an embodiment of the present disclosure.

Accordingly, the intensity and/or darkness of the at least one OFI with respect to at least one alternative OFI may provide insight into the severity of the thoroughfare anomaly when normalized by traffic volume. For example, as shown in FIG. 9, a stretch of thoroughfare with many oil spots may indicate a greater need for repair or resurfacing.

In embodiments, the at least one object detector may be trained and/or run, via a machine learning technique, such that the at least one object detector may be configured to identifying at least one OFI based on the collection of training data collected. Moreover, in these embodiments, the thoroughfare analysis system may be configured to integrate the thoroughfare image with respect to the at least one trained dataset, such that when a new OFI which has not yet manually and/or automatically been labelled, the new OFI may be identified and/or highlighted by the thoroughfare analysis system, such that the new OFI may be entered and configured within the database.

Figure 7C:
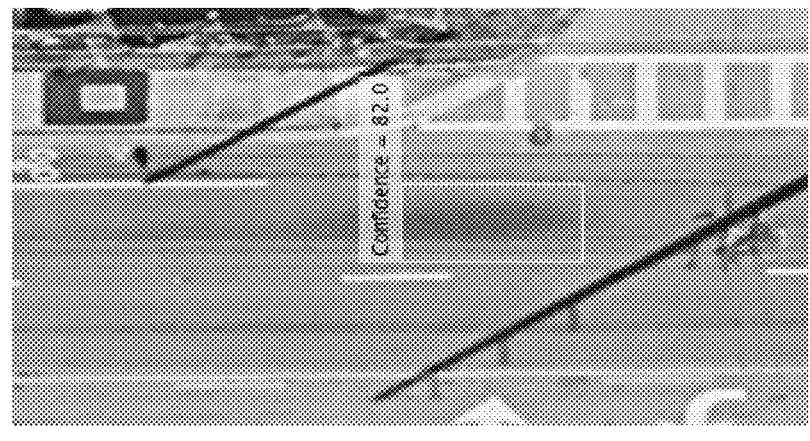
FIGS. 7A-7C are processed satellite images by a thoroughfare analysis system with a level of confidence around a potential area of interest of the thoroughfare analysis system, according to an embodiment of the present disclosure.
Figure 7B:
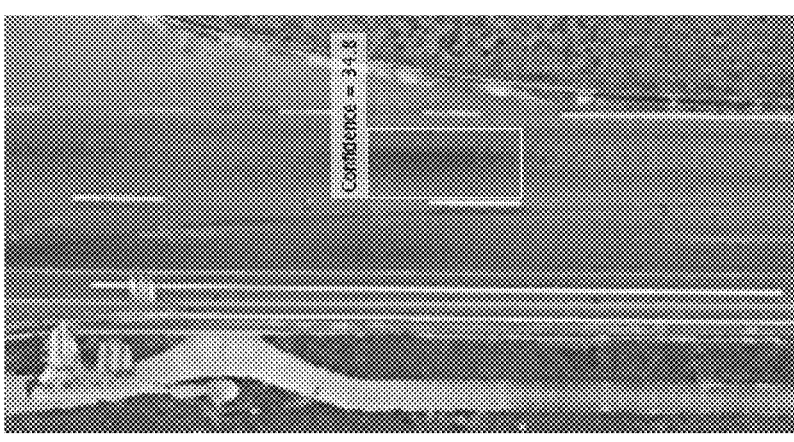
Figure 7A:
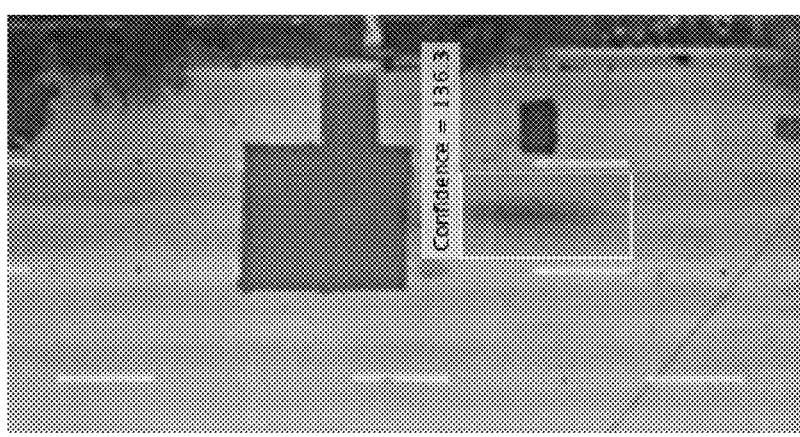

Additionally, as shown in FIGS. 7A-8C and FIG. 10, in embodiments, the thoroughfare analysis system may be configured to convert the thoroughfare image based on the GPS path to gray scale and/or the darkness value of each pixel, comprising a range of 0 to at most 3000, encompassing every integer in between, may be recorded along with the average darkness value of the thoroughfare. As such, as shown in FIGS. 7A-7C, in these embodiments, based on the darkness value of each pixel and/or the average darkness value of the thoroughfare, the object detector of the thoroughfare analysis system may be configured to select and/or highlight (e.g., dispose a bounding box around a section of the thoroughfare) each section of the thoroughfare having a darkness value greater than or equal to the average darkness value of the thoroughfare and/or a predetermined darkness threshold (e.g., user inputted and/or automatically determined based on the at least one trained dataset), such that the object detector may be configured to provide a level of confidence (e.g., low, as shown in FIG. 7B, medium, as shown in FIG. 7C, and/or high, as shown in FIG. 7A) around each section. In these embodiments, the confidence level of each section may be provided to the at least one user, via the display device of the thoroughfare analysis system.

Figure 8C:
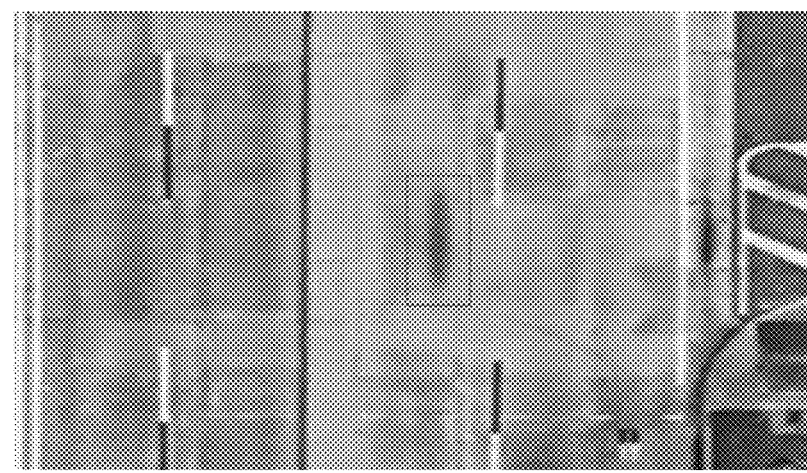
FIGS. 8A-8C are processed satellite images by a thoroughfare analysis system highlighting at least one area of interest of the thoroughfare analysis system, according to an embodiment of the present disclosure.
Figure 8B:
Figure 8A:
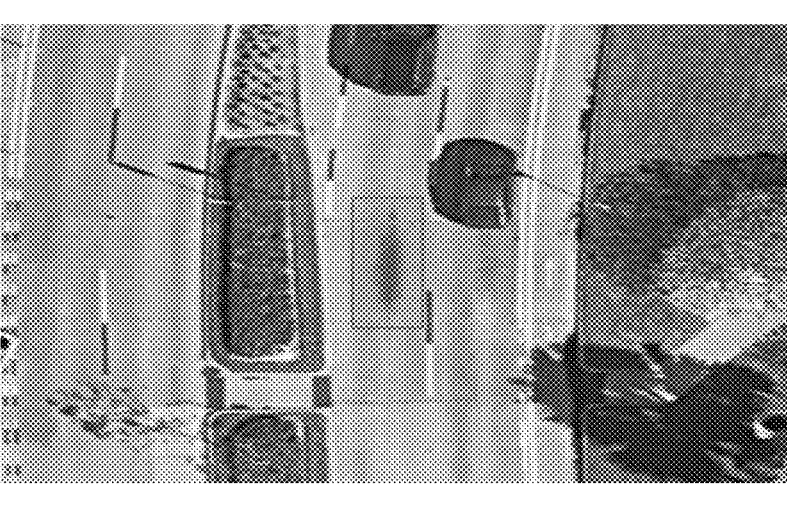
Figure 10:
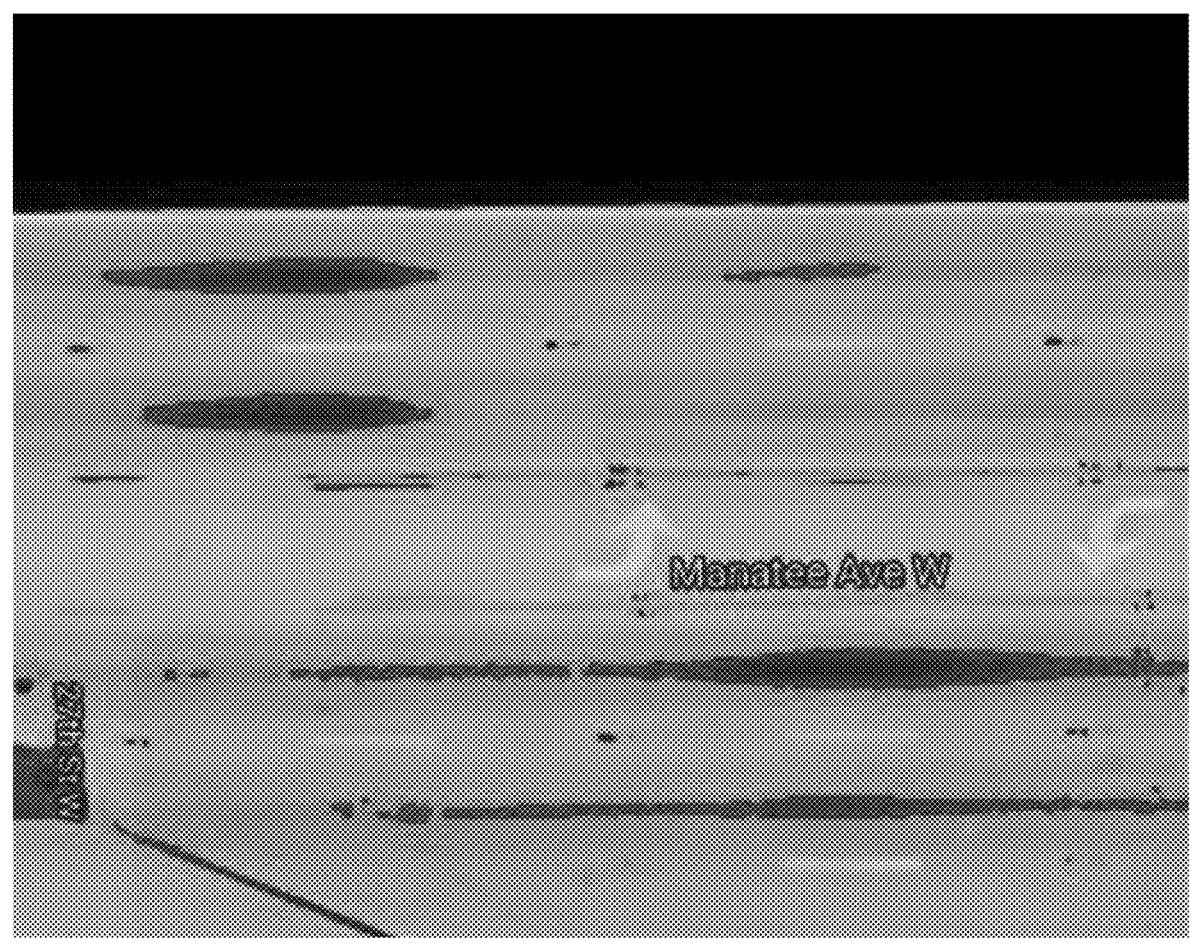
FIG. 10 depicts a processed satellite image input highlighting at least one area of interest of a thoroughfare analysis system, according to an embodiment of the present disclosure.

Accordingly, as shown in FIG. 8A, FIG. 8B, FIG. 8C, and FIG. 10, in these embodiments, each section (alternatively referred to as "pixel") comprising the darkness value and/or the confidence level greater than or equal to the predetermined darkness threshold and/or a predetermined confidence threshold (e.g., user inputted and/or automatically determined based on the at least one trained dataset) may be highlighted and/or identified, as shown in FIGS. 8A-8C, and/or shaded in a high contrast and/or brighter color (e.g., red and/or yellow) and/or all pixels comprising the darkness value and/or confidence level less than the predetermined darkness threshold and/or the confidence level threshold may be identified and/or shaded in low contrast and/or dimmer color (e.g., green, gray, and/or purple), as shown in FIG. 10. In this manner, the thoroughfare analysis system may be configured to identify the pixels shaded in the high contrast and/or brighter color as an area of interest identified during image processing (e.g., the at least one OFI), which corresponds to an areas of oil accumulation. Accordingly, in these embodiments, the thoroughfare analysis system may be configured to identify the pixels shaded in the low contrast and/or dimmer color as an area of non-interest identified during the image processing, which corresponds to an area of little to negligible oil accumulation.

Moreover, in embodiments, based on the confidence level calculated by the object detector, the thoroughfare analysis system may be configured to incorporate the at least one potential OFI into the least one trained dataset, including but not limited to the at least one ground truth dataset. Accordingly, in these embodiments, the object detector may be configured to identify new oil spots that the object detector has not previously encountered.

Figure 4:
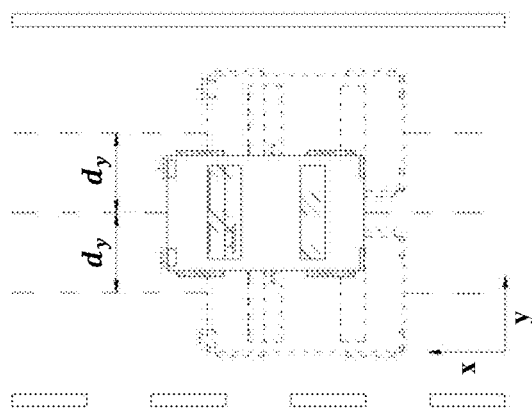
FIG. 4 is a schematic illustration of oil formation on a thoroughfare, according to an embodiment of the present disclosure.
Figure 4:
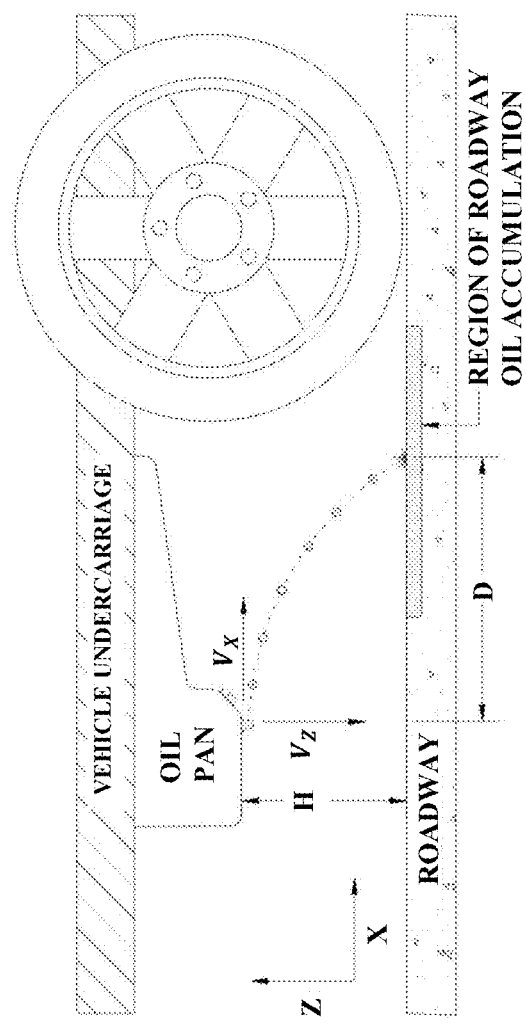

Furthermore, in embodiments, the thoroughfare analysis system may be configured to identify the at least one OFI when the at least one OFI may be ellipsoid-shaped. For example, as vehicles age and become high mileage, it is common for the vehicles to develop small oil leaks due to warn or deteriorating seals in engine and transmission components. As shown in FIG. 4, in this example, the thoroughfare oil spot formations may be a result of these small oil leaks, and/or the shape of the formation may be influenced by vehicle speed (Vx), height of oil droplet release (h), deviation from centerline (dy), and the severity of the bump. As such, in these embodiments, the thorough-fare analysis system may be configured to identify these parameters, allowing the thoroughfare analysis system to input them be configured to provide inputs for the oil drop trajectory.

In this manner, in embodiments, the thoroughfare analysis system may also be configured to identify at least one non-ellipsoid-shaped OFI. As such, the thoroughfare analysis system may be configured to differentiate, identify, and/or highlight ellipsoid OIFs from non-ellipsoid shaped OFIs (e.g., queue lengths) based on the provided data within the at least one trained dataset, which may contain images of at least one ellipsoid OFI. In this manner, the thoroughfare analysis system may be configured to remove the non-ellipsoid-shaped OFI and/or highlight the ellipsoid-shaped OFI as a different color from the non-ellipsoid-shaped OFI and/or increase or decrease the intensity of the ellipsoid-shaped OFI with respect to the non-ellipsoid-shaped OFI.

Additionally, in these embodiments, the thoroughfare analysis system may be configured to transmit a notification indicative that the OFI was a non-ellipsoid-shaped OFI and/or an ellipsoid-shaped OFI to the at least one user via the display device associated with the computing device and/or any device known in the art in which the at least one user may obtain a notification (e.g., a cellular device, an email, a SMS, an auditory, visual, and/or haptic feedback device).

Figure 5:
FIG. 5 graphically depicts a satellite image input of a thoroughfare analysis system, according to an embodiment of the present disclosure.
Figure 6:
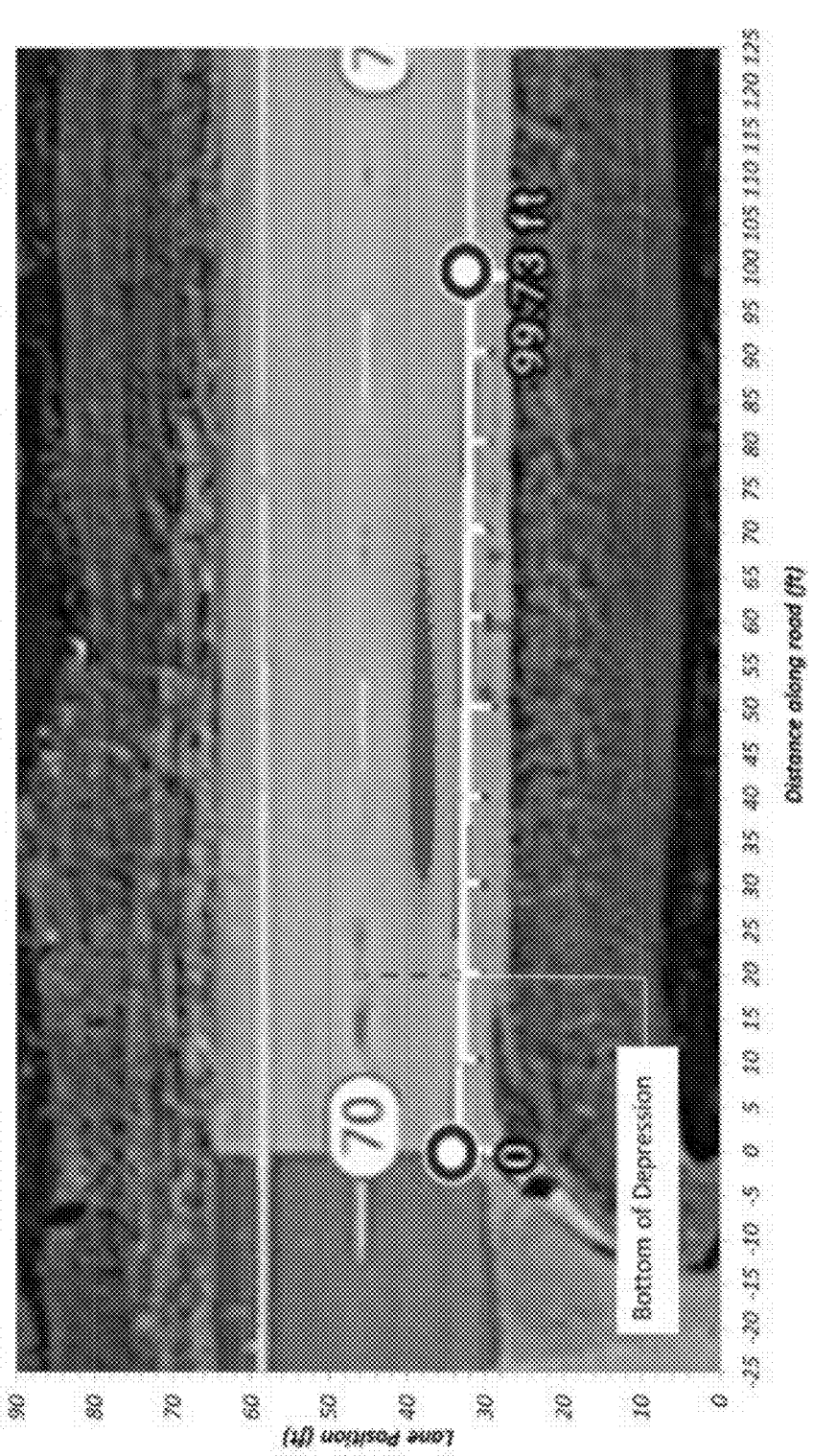
FIG. 6 graphically depicts a Monte Carlo model overlay of a satellite image input of a thoroughfare analysis system, according to an embodiment of the present disclosure.

As shown in FIG. 5 and FIG. 6, in embodiments, the thoroughfare analysis system may be configured to identify and/or highlight at least one new OFI which has not yet been added into the thoroughfare analysis system, such that the thoroughfare analysis system may be configured to simulate and/or overlay the at least one new OFI which has not yet been added into the thoroughfare analysis system with a Monte Carlo model simulation. The Monte Carlo model may comprise the average value and standard deviation of each previously listed parameter to closely simulate the oil spot size and shape seen in thoroughfare images. For example, as shown in FIG. 5, a single oil formation may be shown, and as shown in FIG. 6, the oil formation may be overlayed within the at least one thoroughfare image.

As such, in some embodiments, the Monte Carlo model as shown in FIG. 5 and FIG. 6 may be used to train at least one trained dataset to help improve detection of at least one OFI and/or at least one metric of a vehicle and/or the thorough-fare. For example, by specifying the average height of the vehicle undercarriage and knowing the length of the oil spot, the average and range of speeds vehicles travel can be inferred.

Referring again to FIG. 1, in conjunction with FIGS. 7A-8C and FIG. 10, during step 208, in embodiments, as stated above, the thoroughfare analysis system may be configured to automatically identifying a potential OFI within the thoroughfare, via an object detector.

In this manner, at step 210, once the at least one OFI has been identified, the thoroughfare analysis system may be configured to query the at least one OFI with respect to the at least one image of the at least one trained dataset. Furthermore, at step 212, the thoroughfare analysis system may be configured to compare the OFI and the at least one image of the at least one trained dataset to see if a substantial match exists between the two images. As such, method 200 then may proceed to either step 214 or step 216, depending on whether a substantial match exists between the at least one OFI and the at least one image of the at least one trained dataset as determined by the thoroughfare analysis system.

During step 214, the thoroughfare analysis system may determine that a substantial match exists between the at least one OFI and the at least one image of the at least one trained dataset. As such, during step 214, in these embodiments, the thoroughfare analysis system executes instructions to pro-vide the user with a likelihood of defect of the thoroughfare. In this manner, at step 218, in these embodiments, after the thoroughfare analysis system provides the user with the likelihood of defect of the thoroughfare, the processor may be configured to transmit at least one user at least one metric regarding the condition of the thoroughfare based on the likelihood of defect to the user via the display device associated with the thoroughfare analysis system. As such, the at least one metric regarding a condition of the thor-oughfare may include but is not limited to a number of oil spots per mile of thoroughfare, a recommended speed, a number of potholes, a number of bumps, and/or any metric known in the art which may be used to assess a condition of a thoroughfare.

Accordingly, in embodiments, the thoroughfare analysis system may determine that a higher number of oil spots per mile indicates a thoroughfare with more damage and/or may indicate that the thoroughfare may be in greater need of repair. In this manner, the thoroughfare analysis system may determine that a lower number of oil spots per mile indicates a thoroughfare with less damage and/or may indicate that the thoroughfare may be in a safe condition to drive. Moreover, in these embodiments, the thoroughfare analysis system, via the processor, may be configured to provide the at least one user with a thoroughfare condition assessment based on the likelihood of defect.

Figure 11:
FIG. 11 is an extended view of the alternative satellite image input of FIG. 9, according to an embodiment of the present disclosure.

Additionally, in these embodiments, the thoroughfare analysis system may be configured to calculate and/or identify a wait time and/or a traffic volume based on a length of at least one non-ellipsoid-shaped OFI (e.g., non-ellipsoid-shaped OFI forming lines near intersections behind traffic signals). For example, as shown in FIG. 11, at least one portion of the thoroughfare with short queue lengths and/or long wait times may be indicated by short length, dark intensity OFIs and/or lines. As such, in this example, a at least one street connected to the thoroughfare may show very dark but relatively short queue lines of various lengths dependent on travel volume patterns, including but not limited to the far right lane being rarely obstructed such that a vehicle can freely turn when the opportunity avails. Furthermore, as shown in FIG. 11, in this example, the straight through at least one lane leads to an area with low volumes and/or at least one lane turns on to the main thoroughfare, which is a most commonly travelled path based on the dark intensity OFI and/or lines.

In this manner, in embodiments, the thoroughfare analysis system may be able to detect the amount of intensity (e.g., darkness of the at least one OFI) of the at least one street connected to the thoroughfare and/or lane of the thorough-fare and/or street, and/or compare the amount of intensity of the at least one OFI of the thoroughfare image to at least one image of the at least one trained dataset, such that if the intensity of the at least one OFI of the at least one street connected to the thoroughfare and/or the lane of the street and/or thoroughfare exceeds the at least one OFI of the main thoroughfare, the thoroughfare analysis system may be configured to highlight the at least one OFI and/or provide a notification to the user indicative of the wait time and/or traffic volume of the at least one side street lane.

As shown in FIG. 13, in some embodiments, the at least one OFI may supplement the OFI analysis of the thoroughfare image with data collected and/or identified by at least one vehicle comprising at least one accelerometer travelling over the designated area comprising the at least one OFI. As such, the at least one vehicle may be configured to be in electrical communication with the thoroughfare analysis system, such that collect thoroughfare quality data may be collected and/or inputted into the thoroughfare analysis system and/or the at least one trained dataset as the vehicle drives upon predetermined sections of the thoroughfare. In these other embodiments, the acceleration data may be used to identify bumps, potholes, and/or any other metric known in the art which may be used to assess a condition of a thoroughfare. As such, the acceleration data may be used to modify, enhance, and/or alter the condition assessment and/ or a likelihood of defect of the thoroughfare.

Accordingly, in some embodiments, the thoroughfare analysis system may be configured to provide a standard condition output based on a size of the at least one OFI disposed about the GPS path based on the acceleration data provided by the at least one vehicle comprising at least one accelerometer. In this manner, in these other embodiments, when the acceleration data is incorporated into the thoroughfare analysis system, the thoroughfare analysis system may be configured to alter the likelihood of defect and/or the condition assessment of the thoroughfare (e.g., increase and/or decrease a damage percentage of the thoroughfare) based on the shape and size of the bump, pothole, crack, and/or any other metric known in the art which may be used to assess a condition of a thoroughfare.

Referring again to FIG. 1, at step 218, in embodiments, the thoroughfare analysis system may display a thoroughfare condition assessment (e.g., a damage percentage of the thoroughfare) based on the likelihood of defect and/or provide a notification indicative of repair required for at least one portion of the thoroughfare having the highest likelihood of defect and/or the greater amount of at least one metric provided by the thoroughfare analysis system on the display device associated with the thoroughfare analysis system.

In addition, in embodiments, the thoroughfare analysis system may be configured to be in electrical communication with at least one governmental roadway entity (e.g., Florida Department of Transportation) known in the art and/or at least one roadway repair entity known in the art, such that the notification indicative of repair required for the at least one portion of the thoroughfare may be transmitted and/or recorded in the memory of a database associated with the at least one governmental roadway entity and/or the at least one roadway repair entity. In some embodiments, the thoroughfare analysis system may be configured to inhibit transmitting the notification indicative of repair required for the at least one portion of the thoroughfare until a threshold of the condition assessment has been met. (e.g., a damage percentage of the thoroughfare of at least 60%) based on the calculated likelihood of defect of the thoroughfare based on the at least one trained dataset as compared to the at least one OFI of the at least one image.

Moreover, in embodiments, after displaying the thoroughfare condition assessment and/or the at least one metric of the thoroughfare, the thoroughfare analysis system may be configured to require an input by the at least one user, via at least one user interface (e.g., touchscreen), such that the user may confirm or deny the thoroughfare condition assessment, such that the thoroughfare analysis system may update the condition assessment accordingly. For example, when the at least one metric of the thoroughfare is provided to the at least one user, the at least one user may confirm or deny the accuracy of the location, amount, and/or potential danger of the at least one metric (e.g., a number of potholes and/or bumps). Accordingly, in these embodiments, once the at least one user confirms or denies the accuracy of the at least one metric provided by the thoroughfare analysis system, the thoroughfare analysis system may be configured to update the thoroughfare condition assessment (e.g., increase or decrease the damage percentage of the thoroughfare). In this manner, the thoroughfare analysis system may be configured to update and/or retrain the at least one dataset based on the input of the at least one user with regards to the accuracy of the at least one metric and/or condition assessment provided to the at least one user by the thoroughfare analysis system.

Furthermore, in embodiments, after step 218, method 200 may then progress to step 220, in which the thoroughfare analysis system may be configured to execute instructions, such that the thoroughfare analysis system may be configured to present the at least one user, with at least one alternative GPS path based on the likelihood of defect of the thoroughfare and/or the at least one metric provided regarding the condition of the thoroughfare of the GPS path. In this manner, for example, the at least one alternative GPS path may comprise at least one OFI per mile fewer than the GPS path, such that user may be provided with a thoroughfare with a condition assessment more beneficial and/or healthier (e.g., a thoroughfare with a lower damage percentage) with respect to the thoroughfare of the GPS path.

In these embodiments, the thoroughfare analysis system may be configured to allow the at least one user to input, via the at least one graphical-user interface, at least one filter (e.g., a threshold level of the damage percentage of the thoroughfare), such that at least one portion of the thoroughfare may be included in the alternative GPS path. For example, the at least one user may input a filter of removing at least one portion of the thoroughfare having the damage of the thoroughfare of at least 75%. In this manner, in some embodiments, the thoroughfare analysis system may be configured to remove the at least one portion of the thoroughfare comprising the damage percentage of the thoroughfare of at least 75% and incorporating at least one portion of the alternative thoroughfare comprising a complying condition assessment, such that the thoroughfare analysis system may provide the at least one user with at least one alternative GPS path meeting all requirements of the at least one filter, as provided by the at least one user.

During step 216, in embodiments, the thoroughfare analysis system may determine that a substantial match does not exist between the OFI and the at least one image of the at least one trained dataset. As such, during step 216, the thoroughfare analysis system may execute instructions to automatically incorporate the OFI in to the at least one trained dataset, such that the at least one trained dataset may be retrained, optimizing and/or updating the at least one trained dataset. Accordingly, in these embodiments, the at least one trained dataset may then be configured to identify the at least one OFI if an alternative user may select similar parameters to the original user, such that the same GPS path may be provided to the at least one user.

Furthermore, in embodiments, during step 216, when the thoroughfare analysis system may determine that a substantial match does not exist between the at least one OFI and the at least one image of the at least one trained dataset, the thoroughfare analysis system may be configured to execute instructions to provide the user with a notification indicative of the at least one OFI of the at least one image. In this manner, the thoroughfare analysis system may be configured to provide the at least one user with at least one default metric regarding the condition of the thoroughfare based on the at least one trained dataset. In this manner, the at least one default metric regarding a condition of the thoroughfare may include but is not limited to a number of oil spots per mile of thoroughfare, a recommended speed, a number of potholes, a number of bumps, and/or any metric known in the art which may be used to assess a condition of a thoroughfare based on the at least one trained dataset.

Accordingly, in these embodiments, the thoroughfare analysis system may be configured to require at least one input by the at least one user, via the at least one user interface (e.g., touchscreen) associated with the thoroughfare analysis system, such that the user may confirm or deny the at least one default metric, such that the thoroughfare analysis system may update the at least one default metric accordingly. For example, when the at least one default metric of the thoroughfare is provided to the at least one user, the at least one user may confirm or deny the accuracy of the location, amount, and/or potential danger of the at least one default metric. In addition, in this example, once the at least one user confirms or denies the accuracy of the at least one metric provided by the thoroughfare analysis system, the thoroughfare analysis system may be configured to update and/or retrain the at least one default metric of the at least one trained dataset the thoroughfare condition assessment, accordingly.

The following examples are provided for the purpose of exemplification are not intended to be limiting.

EXAMPLES

Example 1

Analysis of Oil Spot Condition of US41 (N. Florida Ave.)

Figure 12C:
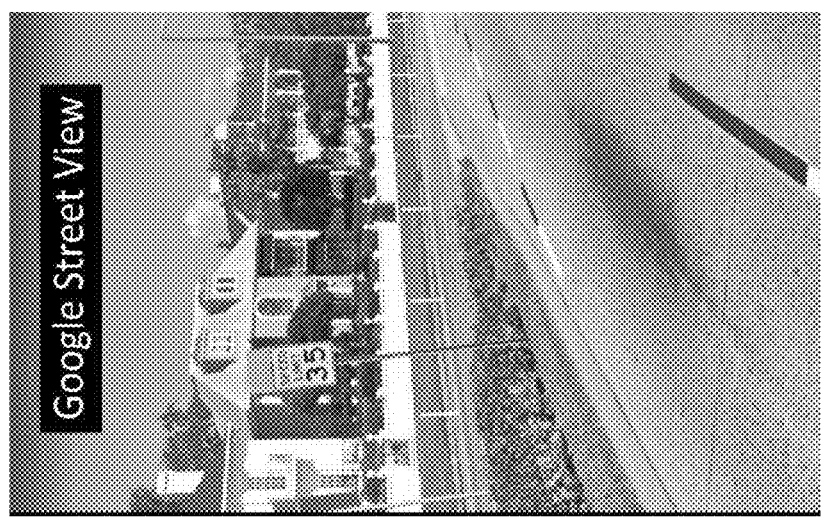
FIGS. 12A-12C are exemplary inputs of a thoroughfare analysis system, according to an embodiment of the present disclosure.
Figure 12B:
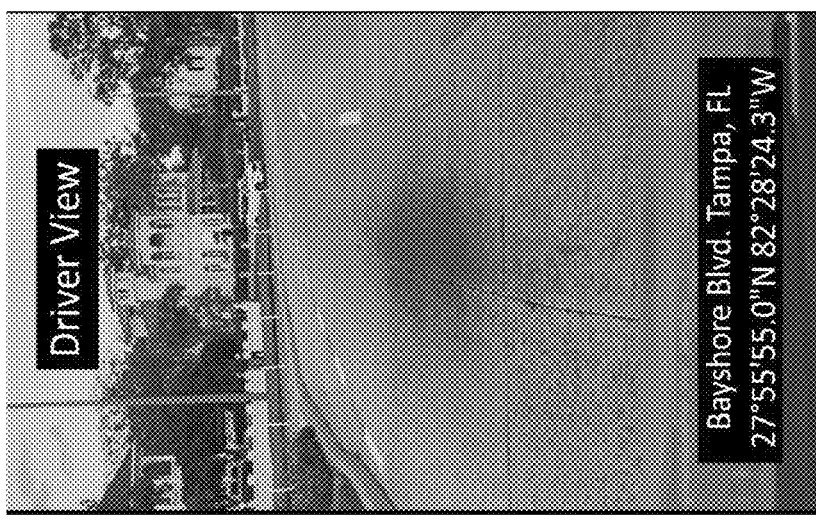
Figure 12A:
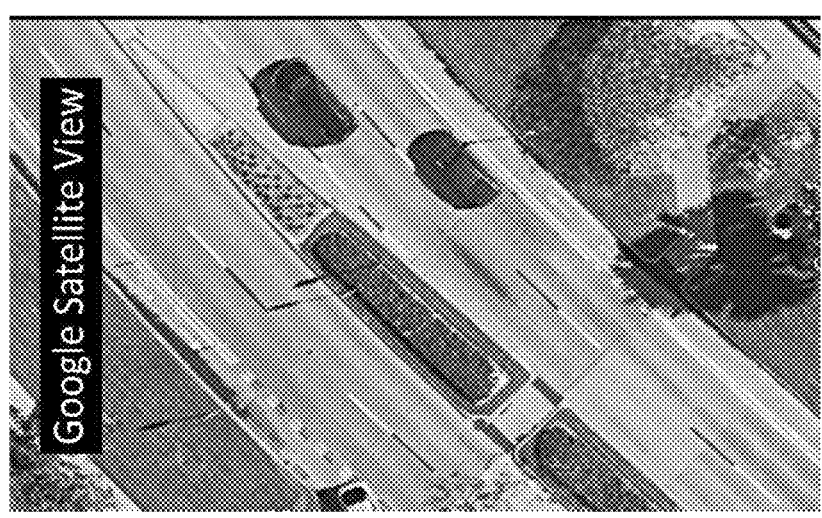

The thoroughfare analysis system was configured to focus solely on scouring internet sources for reliable images of thoroughfare conditions (e.g., Google Earth, NOAA, Google Maps Street View and/or possibly other governmental sources). FIGS. 12A-12C shows an example of the same oil formation as seen through three different data sources. The thoroughfare analysis system was developed to take an initial and final thoroughfare marker and be capable of compiling all the corresponding thoroughfare images present between the initial and final positions. The thoroughfare analysis system provides a means of isolating a section of thoroughfare and gathering the respective data necessary for future processing.

Accordingly, the thoroughfare analysis system was configured to automatically collect satellite images along a section of a thoroughfare. The user could specify a start and end destination and the program will collect a series of satellite images that the object detector can run through to identify oil spots. This automation is required when evaluating many miles of the thoroughfare or thoroughfares which may have complex bends or curves.

As such, the thoroughfare analysis system comprised an object detector (e.g., an aggregate channel feature (hereinafter "ACF")) which was used to identify oil formations of interest. The object detector was trained using a large set of training images and ground truth data. The ground truth data was created by manually labeling the oil formations of interest within each training image. The ACF object detector was trained and run in MATLAB and is a machine learning technique that is capable of identifying new oil formations based on the collection of training data collected.

Multiple machine learning-based object detectors would be capable of performing this assessment of the thoroughfare, however, only the ACF object detector has been explored for this application the ACF object detector was trained within the MATLAB software. MATLAB also has tools used to create the ground truth data used during training. The MATLAB Image Labeler was used to manually identify oil formations within a large set of training images. Once the ACF object detector was trained, it was capable of identifying new and unseen oil formations independently. Using a well-trained machine learning algorithm negates the need to isolate the thoroughfare from the surroundings (buildings, trees, etc.).

Once a set of satellite images have been collected, the images are sent to an ACF object detector that was capable of automatically identifying oil spots within the thoroughfare, as seen in FIGS. 7A-7C. This object detector relies on a large ground truth database, as shown in FIGS. 8A-8C to identify new oil spots that the object detector has not previously encountered. Once the oil spots are identified, the quality of the thoroughfare can be assessed. The number of oil spots per mile of the thoroughfare is a preliminary metric used for thoroughfare quality evaluation. A higher number of oil spots per mile will indicate a thoroughfare with more damage and in greater need of repair.

A simple image processing program was written that isolates the thoroughfare from the remainder of the image by blacking out sidewalks, foliage, and surrounding buildings. The image was then converted to gray scale and the darkness value of each pixel (between 0 and 255) was recorded along with the average darkness value of the thoroughfare. For example, each section of the thoroughfare was then compared to this average darkness value and regions darker than a user defined threshold were identified and shaded red; all below the threshold, green. As shown in FIG. 10, the areas of interest identified during image processing correspond well with areas of oil accumulation.

A second piece of information obtained from oil spot analyses is the identification of persistent queue lengths which in turn could be used for transportation planners to assess level of service. While not noted earlier, FIG. 10 also shows indication of persistent waiting periods along the east bound lanes (lower side of FIG. 10 headed to the right). Wait times and traffic volume are indicated by the lengths of non-ellipsoid oil spots forming lines near intersections behind traffic signals.

The thoroughfare analysis system was configured to detect side roads comprising short queue lengths but long wait times as indicated by short length, dark intensity oil spots/lines. FIG. 11 shows a larger portion of the same thoroughfare section (FIG. 10 as shown by black box) where a side street shows very dark but relatively short queue lines of various lengths dependent on travel volume patterns. The right lane is rarely obstructed and can freely turn when the opportunity avails; the straight through lane (second from right) leads to a residential area with low volumes; the left two lanes turn on to westbound SR64 and which is the most commonly travelled path. The darkness (intensity) of the left three side street lanes exceeds that of the main thoroughfare even in regions where long east bound queues are experienced.

Additionally, a vehicle with accelerometers and a GPS was used to collect thoroughfare quality data by driving selected sections of thoroughfare. The acceleration data was used to identify bumps, potholes, and other anomalies. The oil spot analysis was performed on these same sections of thoroughfare and both assessments will be compared. This testing will provide further validation of the presence of thoroughfare anomalies immediately before an oil spot within the thoroughfare. This data will be collected and processed within the next few months and will be made available.

To validate the proposed approach, correlations between drive quality and thoroughfare imagery were established based on field collection of vehicle acceleration records. Preliminary field work using an inertial 3-axis accelerometer and a GPS were carried out driving south along Business US41 (N. Florida Ave) in Tampa. The 'z-axis', corresponding to the acceleration normal to the thoroughfare, was plotted on top of the respective thoroughfare images as shown in FIG. 13. Even with a slow data collection rate and a relatively poor accelerometer resolution, it was qualitatively shown that the vehicle experienced a substantial acceleration/deceleration event (e.g., vertically) immediately before the oil spot formation on the thoroughfare The preliminary field work presented in the proposal was expanded by instrumenting a research vehicle with a high-speed data collection system and high-resolution accelerometers (tri-axial). Data collection was highly selective triggered either by severe events where oil spots are noted or manually where other types of visual cues may be noted. In all, sections of good and bad thoroughfares was recorded and coupled to thoroughfare images for a stronger interpretation of image meanings. A substantial number of sites were envisioned for the thoroughfare analysis system.

In all cases, the GPS and accelerometer data were overlaid on thoroughfare images to provide a strong foundation for substantiation of the proposed photo-discrimination method and to be incorporated in the thoroughfare analysis system. In this manner, the field data collection included assessment of the size and intensity of oil formations to be correlated to the corresponding accelerometer data. Similarly, vehicle statistics collected from the thoroughfare analysis system were incorporated into Monte Carlo simulations to strengthen the understanding of droplet trajectory and oil spot formation/shape The successful use of thoroughfare imagery to autonomously screen thoroughfare anomalies hinged on the software being smart enough to discriminate between problematic and non-problematic patterns. While FIG. 9 and FIG. 10 show clear evidence of ride quality disturbance and long queues, they also show other changes in thoroughfare surface darkness caused by shadows from light poles, signage, and trees, as shown in FIG. 11.

The thoroughfare analysis system may be configured to analyze all miles in at least one state and/or providence, the United States, and/or any country known in the art with at least on thoroughfare without traversing the thoroughfare. Accordingly, thoroughfare analysis system may effectively mark and/or prioritize the worst thoroughfare in the state and/or country, which could then be further evaluated using the specialized thoroughfare assessment vehicles.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Hu et al., "Information Integration Method in Road Anomaly Monitoring System." CN Patent 111737524. 2 Oct. 2020.

ASCE (2021). "National Infrastructure Report Card, Roads." https://infrastructurereportcard.org/wp-content/uploads/2017/01/Roads-2021.pdf ASCE Florida Section (2021). "Infrastructure Report Card, A Comprehensive Assessment of Florida's Infrastructure."

Detroit Free Press (2021). "Vehicles on the road keep getting older, and COVID could push the age higher." Accessed Jan. 10, 2022. https://www.freep.com/story/money/cars/2020/07/28/covid-average-vehicle-age-12-years/5519557002/

FDOT State Materials Office (2017). "2017 Flexible Pavement Condition Survey Handbook."

USDOT Federal Highway Administration (2021). "Average Miles Driven Per Year by State." Accessed Jan. 10, 2022. https://www.carinsurance.com/Articles/average-miles-driven-per-year-by-state.aspx All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of automatically analyzing a condition of a thoroughfare, the method comprising:

providing a computing device having a processor, wherein the computing device is in electrical communication with at least one server, at least one database, or both;

selecting, via the processor of the computing device, at least one thoroughfare image, by:

providing, via a GPS system of the computing device, a GPS path divided into a plurality of GPS coordinates based on at least one parameter regarding a travel destination of a user;

receiving, via the at least one server, the at least one database, or both, at least one thoroughfare image based on at least one of the plurality of GPS coordinates;

identifying, via the processor of the computing device, at least one oil formation of interest (OFI) based on object detection trained on image intensity and shape;

generating, via the processor of the computing device, a bounding box surrounding the at least one OFI;

comparing, via the processor of the computing device, the at least one OFI with a plurality of training images from a trained dataset to identify the at least one OFI as an ellipsoid shaped OFI or a non-ellipsoid shaped OFI;

in response to identifying the at least one OFI being the ellipsoid shaped OFI:

calculating, via the processor of the computing device, a likelihood of defect within the bounding box based on weighted scoring between the at least one ellipsoid shaped OFI and at least one of the plurality of training images from the trained dataset, wherein the defect is positioned prior to the ellipsoid shaped OFI and the defect results in a downward vehicle motion coupled with an upward acceleration resulting in the ellipsoid shaped OFI; and generating, via the processor of the computing device, a ranked list of thoroughfare sections most in need of repair based on the number of ellipsoid shaped OFIs per mile of thoroughfare and the calculated likelihood of defect associated with each of the ellipsoid shaped OFIs per mile, thereby prioritizing roadway repairs according to the ranked list.

2. The method of claim 1, further comprising, in response to identifying the at least one OFI being the non-ellipsoid shaped OFI:

generating, via the processor of the computing device, one or more estimated wait times based upon one or more of the intensity and length of the at least one non-ellipsoid shaped OFI.

3. The method of claim 1, further comprising, after generating the bounding box surrounding the at least one OFI of the at least one thoroughfare image, highlighting the at least one OFI of the at least one thoroughfare image, wherein the highlight of the at least one OFI of the at least one thoroughfare image is brighter than at least one remaining aspect of the at least one OFI.

4. The method of claim 1, further comprising, providing, via the processor of the computing device, at least one metric regarding a condition of the thoroughfare based on the calculated likelihood of defect.

5. The method of claim 4, further comprising, after providing at least one metric regarding a condition of the thoroughfare based on the calculated likelihood of defect, calculating, via the processor of the computing device, at least one alternative GPS path, at least one alternative thoroughfare, or both to the travel destination based on the at least one metric regarding the condition of the thoroughfare.

6. The method of claim 5, further comprising, after calculating at least one alternative GPS path, at least one alternative thoroughfare, or both, displaying, via the display device of the computing device, the at least one calculated alternative GPS path, alternative thoroughfare, or both by:

based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and based on a determined that the likelihood of defect of the thoroughfare is less than the likelihood of defect of the at least one calculated alternative thoroughfare, maintaining the GPS path to conform to the thoroughfare.

7. The method of claim 6, wherein the at least one metric is selected from a group consisting of a recommended speed, a number of potholes per mile on the thoroughfare, a number of bumps per mile on the thoroughfare, and a combination of thereof.

8. The method of claim 1, further comprising, after-transmitting the likelihood of defect to the display device of the computing device, and receiving an instruction to unload, from the memory of the computing device, the at least one thoroughfare image.

9. The method of claim 8, further comprising, after receiving an instruction to unload the at least one thoroughfare image, receiving at least one alternative thoroughfare image based on at least one alternative GPS path provided from at least one set of alternative parameters.

10. A thoroughfare analysis system for automatically analyzing a condition of a thoroughfare, the thoroughfare analysis system comprising:

a computing device having a processor, wherein the computing device is in electrical communication with at least one server, at least one database, or both; and a non-transitory computer-readable medium operably coupled to the processor, the computer-readable medium having computer-readable instructions stored thereon that, when executed by the processor, cause the thoroughfare analysis system to automatically analyze the condition of the thoroughfare by executing instructions comprising:

selecting, via the processor of the computing device, at least one thoroughfare image, by:

providing, via a GPS system of the computing device, a GPS path divided into a plurality of GPS coordinates based on at least one parameter regarding a travel destination of a user;

receiving, via the at least one server, the at least one database, or both, at least one thoroughfare image based on at least one of the plurality of GPS coordinates;

identifying, via the processor of the computing device, at least one oil formation of interest (OFI) based on object detection trained on image intensity and shape;

generating, via the processor of the computing device, a bounding box surrounding the at least one OFI;

comparing, via the processor of the computing device, the at least one OFI with a plurality of training images from a trained dataset to identify the at least one OFI as an ellipsoid shaped OFI or a non-ellipsoid shaped OFI;

in response to identifying the at least one OFI being the ellipsoid shaped OFI:

calculating, via the processor of the computing device, a likelihood of defect within the bounding box based on weighted scoring between the at least one ellipsoid shaped OFI and at least one of the plurality of training images from the trained dataset, wherein the defect is positioned prior to the ellipsoid shaped OFI and the defect results in a downward vehicle motion coupled with an upward acceleration resulting in the ellipsoid shaped OFI; and generating, via the processor of the computing device, a ranked list of thoroughfare sections most in need of repair based on the number of ellipsoid shaped OFIs per mile of thoroughfare and the calculated likelihood of defect associated with each of the ellipsoid shaped OFIs per mile, thereby prioritizing roadway repairs according to the ranked list.

11. The thoroughfare analysis system of claim 10, wherein the executed instruction further includes, in response to identifying the at least one OFI being the non-ellipsoid shaped OFI:

generating, via the processor of the computing device, one or more estimated wait times based upon one or more of the intensity and length of the at least one non-ellipsoid shaped OFI.

12. The thoroughfare analysis system of claim 10, further comprising, after generating the bounding box surrounding the at least one OFI of the at least one thoroughfare image, highlighting the at least one OFI of the at least one thoroughfare image, wherein the highlight of the at least one OFI of the at least one thoroughfare image is brighter than at least one remaining aspect of the at least one OFI.

13. The thoroughfare analysis system of claim 10, wherein the executed instructions further comprise, providing, via the processor of the computing device, at least one metric regarding a condition of the thoroughfare based on the calculated likelihood of defect.

14. The thoroughfare analysis system of claim 13, wherein the executed instructions further include, after providing at least one metric regarding a condition of the thoroughfare based on the calculated likelihood of defect, calculating, via the processor of the computing device, at least one alternative GPS path, at least one alternative thoroughfare, or both to the travel destination based on the at least one metric regarding the condition of the thoroughfare.

15. The thoroughfare analysis system of claim 14, wherein the executed instructions further comprise after calculating at least one alternative GPS path, at least one alternative thoroughfare, or both, displaying, via the display device of the computing device, the at least one calculated alternative GPS path, alternative thoroughfare, or both by:
   based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and
   based on a determined that the likelihood of defect of the thoroughfare is less than the likelihood of defect of the at least one calculated alternative thoroughfare, maintaining the GPS path to conform to the thoroughfare.

16. The thoroughfare analysis system of claim 15, wherein the at least one metric is selected from a group consisting of a recommended speed, a number of potholes per mile on the thoroughfare, a number of bumps per mile on the thoroughfare, and a combination of thereof.

17. The thoroughfare analysis system of claim 10, wherein the executed instructions further comprise transmitting the likelihood of defect to the display device of the computing device, and receiving an instruction to unload, from the memory of the computing device, the at least one thoroughfare image.

18. The thoroughfare analysis system of claim 17, wherein the executed instructions further comprise, after receiving an instruction to unload the at least one thoroughfare image, receiving at least one alternative thoroughfare image based on at least one alternative GPS path provided from at least one set of alternative parameters.

19. A method of automatically providing an optimized GPS path to a travel destination based on a condition of a thoroughfare, the method comprising:
   providing a computing device having a processor, wherein the computing device is in electrical communication with at least one server, at least one database, or both;

selecting, via the processor of the computing device, at least one thoroughfare image, by:
providing, via a GPS system of the computing device, a GPS path divided into a plurality of GPS coordinates based on at least one parameter regarding a travel destination of a user;
receiving, via the at least one server, the at least one database, or both, at least one thoroughfare image based on at least one of the plurality of GPS coordinates;
identifying, via the processor of the computing device, at least one oil formation of interest (OFI) based on object detection trained on image intensity and shape;
generating, via the processor of the computing device, a bounding box surrounding the at least one OFI;
comparing, via the processor of the computing device, the at least one detected OFI with a plurality of training images from a trained dataset to identify the at least one OFI as an ellipsoid shaped OFI or a non-ellipsoid shaped OFI;
in response to identifying the at least one OFI being the ellipsoid shaped OFI:
calculating, via the processor of the computing device, a likelihood of defect within the bounding box based on weighted scoring between the at least one ellipsoid shaped OFI and at least one of the plurality of training images from the trained dataset, wherein the defect is positioned prior to the ellipsoid shaped OFI and the defect results in a downward vehicle motion coupled with an upward acceleration resulting in the ellipsoid shaped OFI;
calculating, via the processor of the computing device, at least one alternative GPS path, at least one alternative thoroughfare, or both to the travel destination based on the likelihood of defect of the thoroughfare; and
automatically displaying, via the display device of the computing device, the GPS path, the at least one calculated alternative GPS path, or both by:
based on a determination that the likelihood of defect of the thoroughfare is greater than the likelihood of defect of the at least one calculated alternative thoroughfare, altering the GPS path to conform to the at least one calculated alternative GPS path, alternative thoroughfare, or both; and
based on a determined that the likelihood of defect of the thoroughfare is less than the likelihood of defect of the at least one calculated alternative thoroughfare, maintaining the GPS path to conform to the thoroughfare.

20. The method of claim 19, further comprising:
receiving an instruction to unload, from the memory of the computing device, the at least one thoroughfare image; and
receiving at least one alternative thoroughfare image based on at least one alternative GPS path provided from at least one set of alternative parameters.

* * * * *